United States Patent [19]
Decoene

[11] 4,211,059
[45] Jul. 8, 1980

[54] ROW CROP ATTACHMENT

[75] Inventor: Frans J. G. C. Decoene, Zedelgem, Belgium

[73] Assignee: Sperry Corporation, New Holland, Pa.

[21] Appl. No.: 956,710

[22] Filed: Nov. 1, 1978

[30] Foreign Application Priority Data

Oct. 24, 1978 [GB] United Kingdom ............... 46542/77

[51] Int. Cl.³ ........................................... A01D 45/02
[52] U.S. Cl. .......................................... 56/94; 56/109
[58] Field of Search ............................ 56/14.3, 51–54, 56/94–100, 105, 106, 109

[56] References Cited

U.S. PATENT DOCUMENTS

| 1,155,827 | 10/1915 | Liebl | 56/109 |
| 2,648,942 | 8/1953 | Grant et al. | 56/14.3 |
| 2,766,575 | 10/1956 | Fergason | 56/109 |
| 2,949,717 | 8/1960 | Johannesen | 56/14.3 |
| 3,791,117 | 2/1974 | Lawrence | 56/98 |

FOREIGN PATENT DOCUMENTS

| 318278 | 2/1972 | Austria | 56/13.8 |
| 2369785 | 11/1976 | France | 56/94 |
| 1356698 | 6/1974 | United Kingdom | 56/13.8 |

Primary Examiner—Russell R. Kinsey
Attorney, Agent, or Firm—Frank A. Seemar; Ralph D'Alessandro; Larry W. Miller

[57] ABSTRACT

The invention provides a low profile, compact row crop attachment which eliminates the use of crop conveyors in the form of chains with crop-engaging extensions attached thereto, such conveyors being subject to fast wear and being relatively expensive to replace. The chain type conveyors are replaced by a plurality of pairs of rotary means provided on opposite sides of an associated stalkway defined by a pair of spaced apart members. Conveyor means extend from the rotary means from outside into the associated stalkway so as, in operation, to convey crop along that stalkway, the conveyor means of each pair of rotary means having overlapping paths.

16 Claims, 7 Drawing Figures

ROW CROP ATTACHMENT

BACKGROUND OF THE INVENTION

1. Field of the Invention

This invention relates to row crop attachments for harvesting machines. The invention will be discussed in relation to forage harvesters but is not restricted thereto.

In the preparation of forage from "stalk" crops, such as corn and sorghum, the entire stalk, including the grain, is cut and fed to a chopping or cutter unit for chopping into small feed pieces. Forage harvesters for preparing forage in this way normally comprise a base unit having a chopping mechanism and a crop gathering unit which cuts the crop and conveys it to the chopping mechanism. The chopped or cut crop is blown, or otherwise conveyed, into a trailing wagon or the like in which it is transported to a silo or other storage facility.

2. Description of the Prior Art

Crop gathering attachments have been developed to cut one, two, three or four rows of crop at one time. These gathering means comprise a mechanism for severing the stalks and delivering them, butt ends first, between opposed feed elements. Such gathering means also comprise a pair of laterally opposed gathering frames for each row of crop, the frames defining between them a stalk-receiving passage in advance of, and aligned with, the feed elements. Angularly disposed flights of gathering chains are usually provided along the gathering frames to insure that the stalks move rearwardly into the forage harvester and to hold the stalks in the required orientation until they are acted upon by the feed elements. The gathering frames customarily are provided with rearwardly and upwardly inclined fenders or surfaces over which the stalks may ride and be supported during their movement through the gathering means.

In the past a large number of moving parts have been incorporated in the crop gathering means. Usually two or more pairs or superposed gathering chains, and associated drive means, have been employed per row of crop handled by the harvester. Such a large number of moving parts not only requires a great amount of motive power but also increases the cost of manufacture, maintenance and operation. Also, the gathering chains, which are quite expensive, are fast-wearing components and it is not exceptional to have to replace all gathering chains at the end of every season and even replacement during the course of a season is sometimes necessary. Chain replacement is a time-consuming, cumbersome and expensive exercise. In addition, the large number of moving parts and their supporting structure result in a relatively heavy crop gathering attachment which is particularly undesirable in certain machines. For example, in some forage harvesters the crop gathering attachment used to harvest corn may be interchanged with other attachments, such as those used for picking up hay in windrows or direct cutter units for grass. A heavy or bulky gathering unit increases the difficulty of attachment and detachment, and also of supporting and adjusting the gathering unit relative to the base unit. As the gathering attachments are attached to the forward end of the base unit, heavy attachments may result in an undesirable positioning of the center of gravity relative to the wheel base of the machine.

Despite the large number of crop-engaging components normally employed, some of the severed crop escapes the action of the conveying means and either becomes entangled in the various components and plugs the machine or falls to the ground and is a loss to the harvesting operation.

Other crop gathering attachments have only one pair of gathering chains per crop row. The height of such attachments is substantially smaller than the height of those described above and, therefore, these attachments are often identified as "low profile" attachment. The drive means in a "low profile" attachment are less complicated and comprise fewer components, whereby the cost thereof is also reduced accordingly. Unfortunately, such low profile attachments need to be moved much more accurately along the rows of crop, otherwise stalks frequently are missed by the gathering chains and thus lost. This requires the sustained attention of the operator which is tiring and can slow down the operation of the harvester. This problem is accentuated when harvesting corn which has been wholly or partially flattened by storms, or when harvesting tall crop. Also severed stalks occasionally escape the grasp of the gathering chains and are lost. Furthermore, the low profile gathering attachments still have the expensive and fast-wearing gathering chains.

Gathering attachments without gathering chains are also known. Some of these attachments have a pair of opposed upright gathering rolls positioned forwardly of the conventional transverse feed rolls and at the rear end of the crop gathering frames. Others have two pairs of opposed, vertical gathering rolls. The forwardmost gathering rolls have a pair of rotary cutting blades adjacent their lower ends for severing the stalks from the ground during operation, and both pairs of rolls operate to convey cut crop rearwardly of the forage harvester either to transverse pre-compression feed rolls or to the chopping unit disposed immediately rearwardly thereof. This type of gathering attachment has a limited harvesting capacity. Moreover, crop-feeding problems frequently occur with such arrangements and therefore, this type of forage harvester attachment has, to date, not been acceptable.

SUMMARY OF THE INVENTION

The object of the present invention is to overcome or to attenuate one or more of the foregoing disadvantages of known row crop attachments.

According to the present invention a row crop attachment comprises at least one pair of spaced apart members defining an elongated stalkway therebetween, a plurality of rotary means provided in pairs on opposite sides of the or each stalkway, and conveyor means mounted on the rotary means and extending from outside into the associated stalkway so as, in operation, to convey crop material along that stalkway, the conveyor means of each pair of rotary means having overlapping paths.

Preferably, each stalkway is linear and two stalkways may be provided which are inclined inwardly of the attachment from the front, crop intake end, to the rear, crop discharge end. The rotary means may comprise shafts and the conveyor means may comprise crop conveying elements mounted on the respective shafts. In a preferred embodiment, all but the rotary means at the crop discharge end of the attachment are provided with two sets of crop conveying elements spaced axially of the associated shafts, the sets being increasingly more closely spaced from front to rear of the attachment such that the two sets of elements of one shaft lie between the sets of elements of the immediately preceding shaft. The rotary means at the discharge end of the attachment may be provided with a single crop conveying element.

The crop conveying elements may comprise a plurality of blades extending generally radially of the respective shafts and having a curved leading face such that the outer end of each blade trails the base end when seen in the direction of rotation of the associated shaft. The trailing face of each blade may be made the mirror image of the leading face, whereby the direction of rotation of the crop conveying elements may be reversed, which action may be required to remove a blockage in a stalkway. Alternatively, the crop conveying elements may be in the form of discs of flexible material.

The spaced apart members defining the or each stalkway may comprise a pair of crop gathering frames which are extended forwardly of the stalkway defined thereby in a divergent manner. Additional rotary means fitted with crop conveyor means are provided on the forward extension of each frame. The crop conveying means on the additional rotary means may be similar to those provided on the rotary means associated with the stalkways or may comprise generally radially extending fingers which may be made retractable such as by cam means, for example.

BRIEF DESCRIPTION OF THE DRAWINGS

A row crop attachment in accordance with the invention and for use on a forage harvester will now be described in greater detail, by way of example, with reference to the accompanying drawings, in which.

DETAILED DESCRIPTION OF THE PREFERRED EMBODIMENT

The terms "forward", "rearward", rgith-hand side" and "left-hand side" used throughout the specification are with respect to the direction of movement of the machine in operation.

Figure 1:
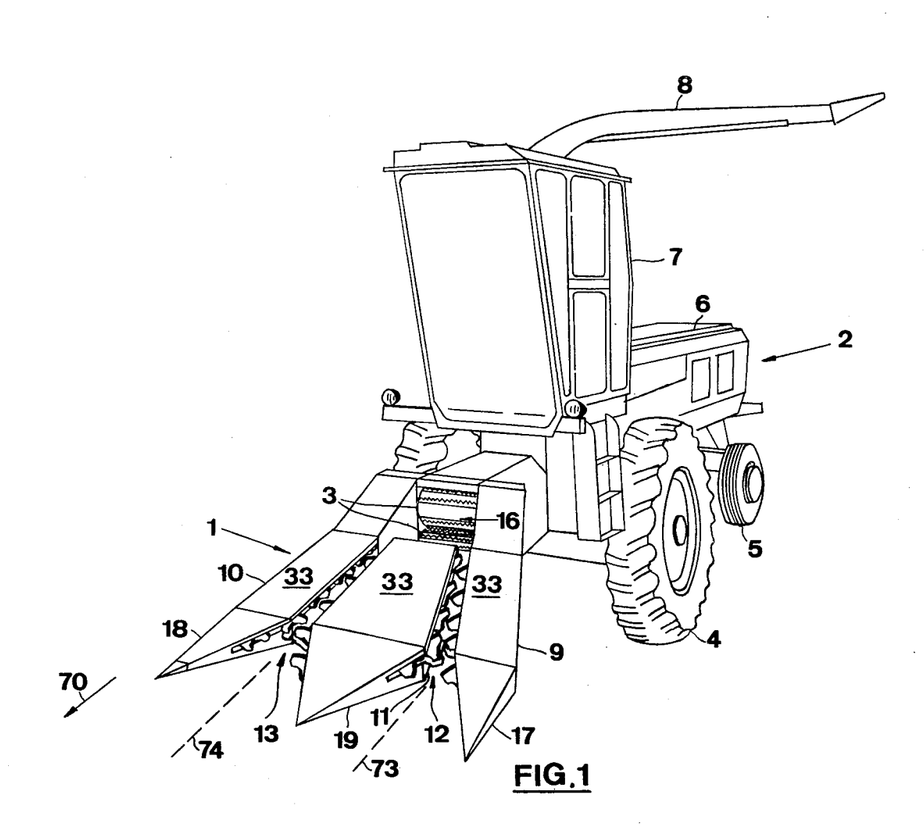
FIG. 1 is a perspective view of the row crop attachment mounted on a self-propelled forage harvester.

Referring to FIG. 1 there is shown a self-propelled forage harvester comprising a row crop attachment or crop gathering unit 1 (constructed in accordance with the present invention) mounted on a base unit 2. The base unit 2 comprises the usual feed rolls 3 and a chopping mechanism or cutterhead (not shown), the base unit being supported on a pair of traction wheels 4 and a pair of steerable wheels 5. The base unit 2 further comprises an engine compartment 6 with a power source therein and an operator's cab 7 housing the operator's seat, steering wheel and various controls. The chopping mechanism or cutting head and the feed rolls 3 of the base unit 2 are driven in a conventional manner through gears and pulleys, receiving their power from the power source incorporated in the machine. Chopped material is discharged through a spout 8 into a trailer or the like (not shown).

Turning now to FIGS. 2 to 6, the embodiment of the invention will be described in greater detail. The row crop attachment 1 comprises a pair of outer longitudinally-extending crop gathering frames 9 and 10 and a central guide frame 11 laterally spaced from each other to form between the respective outer frames 9 and 10 and the central guide frame 11 two crop stalkways or passages 12 and 13. The attachment 1 further comprises cutter means 14 for severing crop stalks received in the stalkways 12 and 13, and crop conveyor means generally indicated at 15 for engaging the stalks and moving them upwardly and rearwardly in the stalkways 12 and 13 for delivery to the base unit 2.

Figure 2:
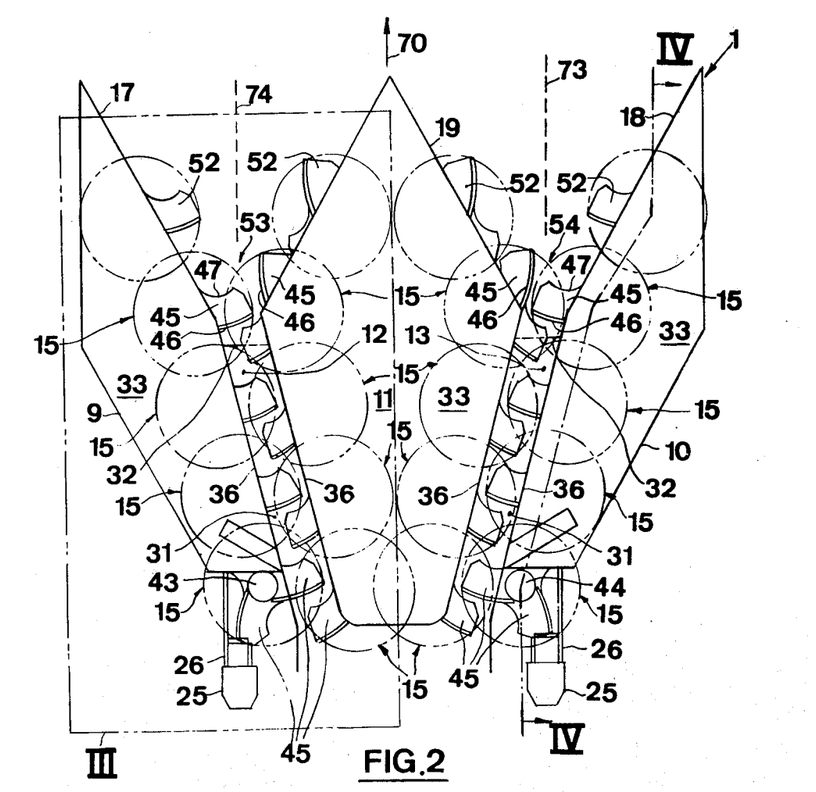
FIG. 2 is an enlarged top view of the row crop attachment.
Figure 3:
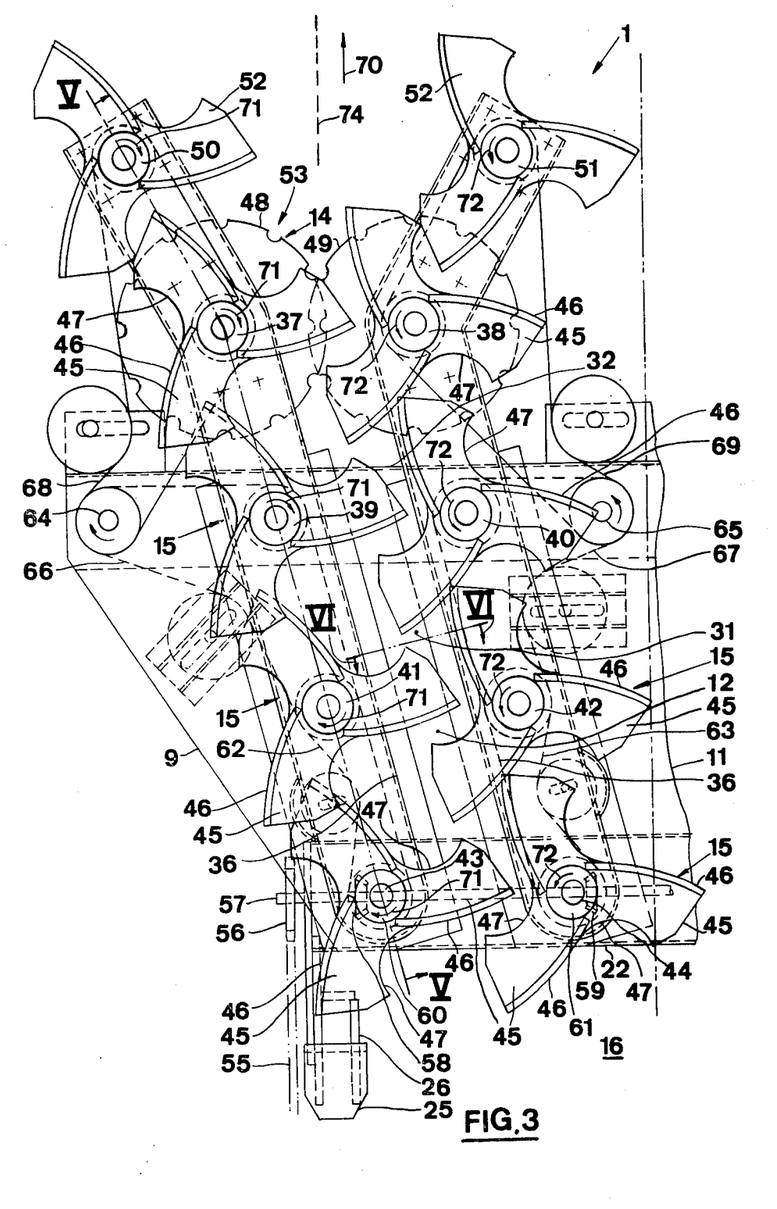
FIG. 3 is a view to a larger scale, of that part of FIG. 2 indicated at III, with certan components removed.
Figure 4:
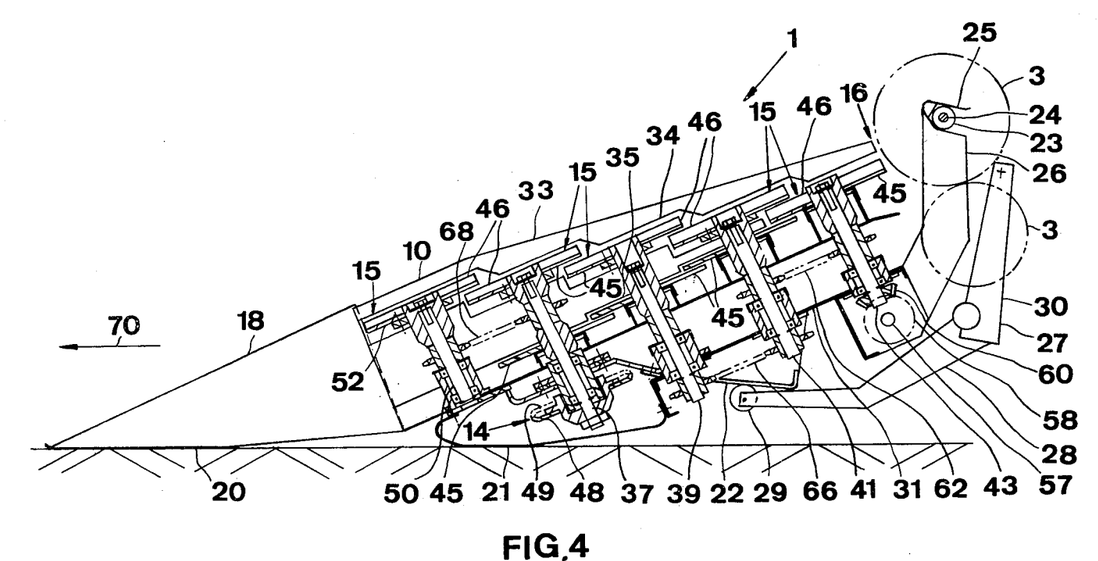
FIG. 4 is a section on the line IV—IV of FIG. 2.
Figure 5:
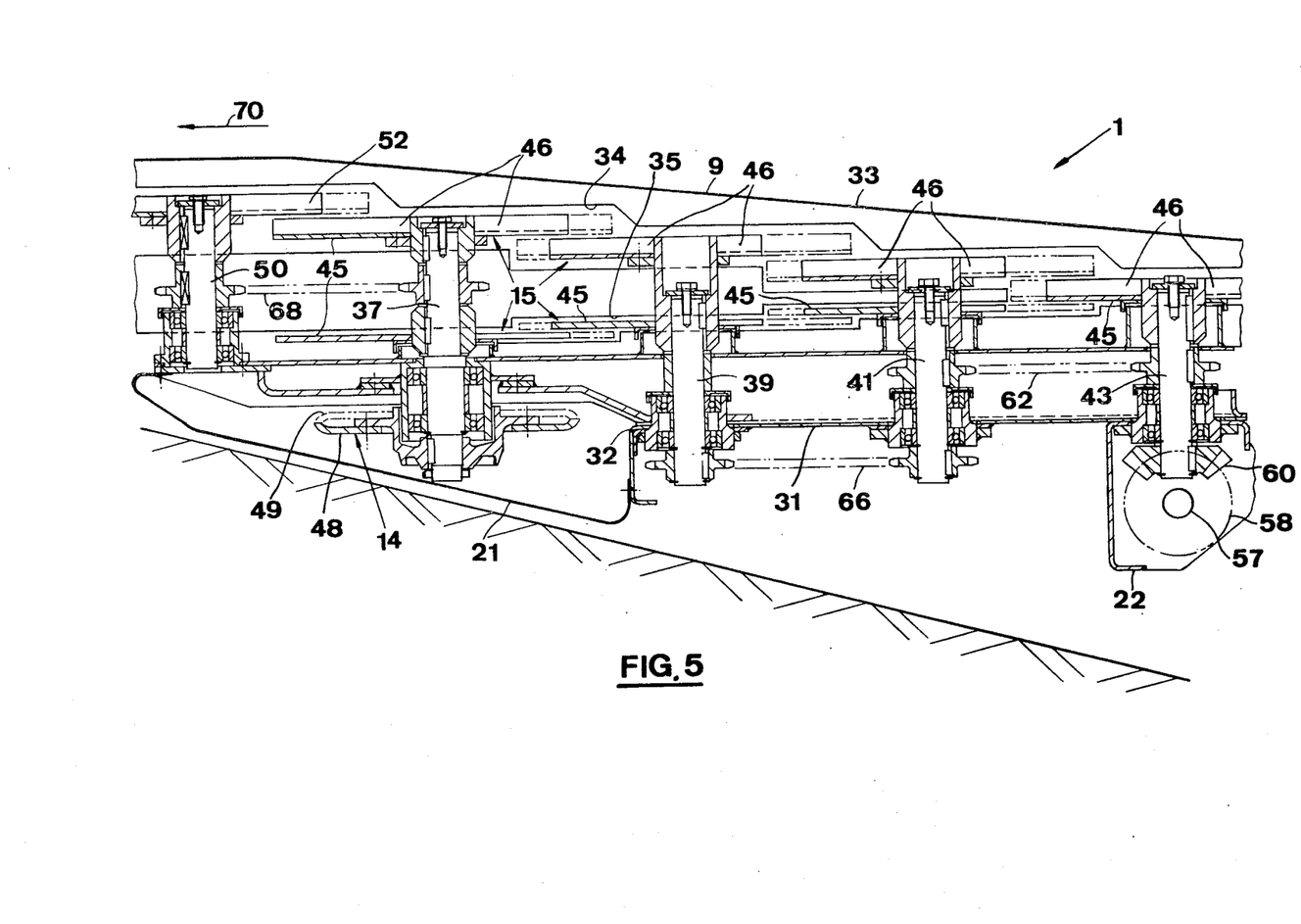
FIG. 5 is a section on the line V—V of FIG. 3.
Figure 6:
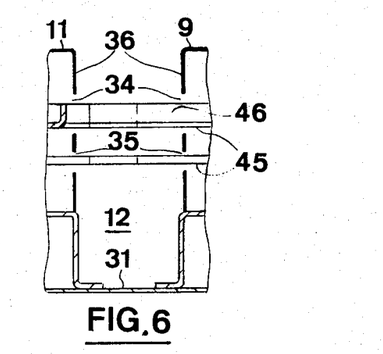
FIG. 6 is a section on the line VI—VI of FIG. 3.

The crop gathering frames 9, 10 and 11 are formed of sheet metal and are so laterally spaced apart as to pass at opposite sides of two rows of crop. The frames 9, 10 and 11 are joined together at the lower portions of their rearward ends and form a throat 16 having a width substantially equal to that of the cutterhead in the base unit 2. The sides of the central guide frame 11 taper towards each other in a rearward direction and terminate at the discharge end of the attachment 1. The inwardly facing sides of the frames 9 and 10 diverge in the rearward direction to define, at their discharge end, the throat 16. When seen in the operative position, the frames 9, 10 and 11 slope downwardly and forwardly to points near the ground and their forward ends are provided with respective sheet metal nose members 17, 18 and 19 which have oppositely facing walls diverging forwardly to form stalkway entrances which are wider than the stalkways 12,13 themselves. The forward ends of the nose members 17, 18 and 19 are provided with shoes 20 which protect the sheet metal portions and absorb any wearing action which might occur as a result of engagement with the ground. Ground-engaging skids 21 are arranged underneath the frames 9,10 and 11 to support a portion of the weight of the row crop attachment on the ground and for following the ground contours.

The entire sheet metal structure forming the frames 9,10 and 11, the throat 16 and the nose members 17,18 and 19 is mounted on a frame 22 to form a unitary structure adapted to be detachably mounted on the base unit 2.

The means for mounting the row crop attachment 1 on the base unit 2 comprises a pair of bearing studs 23 mounted at opposite sides on the cutterhead of the base unit 2. One of the studs 23 carries a transverse shaft 24 for a purpose to be described later. The studs 23 are engageable by brackets 25 on arms 26 of the frame 22 of the row crop attachment 1. This arrangement permits limited pivotal movement of the attachment 1 relative to the base unit 2. The lifting of the attachment 1 relative to the base unit 2 is accomplished by a lifting frame 27 pivotally mounted on the base unit 2 and comprising a pair of forwardly-projecting arms 28 having rollers 29 at their forward ends for engaging the underside of the frame 22, and an upwardly-projecting arm 30 which is coupled at its upper end to a hydraulic cylinder (not shown) supported on the base unit 2. Actuation of the hydraulic cylinder results in an angular displacement of the lifting frame 27 around its pivot and hence also in an angular displacement of the attachment 1 around the bearing studs 23. The forward end of the header unit 1 may thus be adjusted vertically to dispose the shoes 20 at the desired height above the ground. The skids 21 may be adjusted to contact the ground surface so as to raise the attachment 1 over rises or obstructions in the field.

Each stalkway 12 and 13 is straight and inclined inwardly of the attachment, bottom walls 31 being provided therefor, which walls extend from forward edges 32 to the crop discharge end of the attachment to form the bottom of the throat 16. The upper faces of the frames 9,10 and 11 are covered by top walls 33, whereby the frames are totally enclosed except for stepped apertures 34 and 35 (FIG. 5) provided in the side walls 36 of the stalkways 12 and 13, through which apertures extend the crop conveyor means 15. As will be seen from FIGS. 4 and 5, the height of the frames 9,10 and 11, and the stalkways 12 and 13, decrease from front to rear along the stalkways, the height of the forward ends of the stalkways being from one and a half to twice the height at the crop discharge ends.

The crop conveyor means 15 are provided on first, second, third and fourth pairs of rotary means in the form of driven shafts 37,38; 39,40; 41,42 and 43,44 located within the associated frames 9, 10 and 11 and hence outside the stalkways 12 and 13. The conveyor means are in the form of three-bladed elements mounted generally radially of the respective shafts 37 to 44, each blade 45 having a planar leading face 46 and a concave trailing edge 47, relative to the direction of rotation. The leading faces 46 are curved such that the outer ends trail the base ends when seen in the direction of rotation of the shafts 37 to 44. The paths of the blades 45 of respective pairs of rotary means and of adjacent rotary means overlap so that substantially the entire stalkways 12 and 13 ae covered by the paths which leads to very positive crop movement. The blades 45 on opposed sides of each stalkway 12 and 13 are at the same height relative to each other and intermeshing to prevent physical interference during operation.

As regards the rotary means and blades 45 on one and the same side of each stalkway 12 and 13, these are rotated in phase with each other but out of phase with the units on the opposite side of the associated stalkway. Furthermore, the first, second and third pairs of rotary means are provided with a pair of axially spaced sets of blades 45, the sets of blades on the shafts 37 and 38 being relatively widely spaced, the sets of blades on the shafts 39 and 40 being more closely spaced so as to lie inside the sets of blades on the respective shafts 37 and 38. The sets of blades on the shafts 41 and 42 lie inside the sets of blades on the respective shafts 39 and 40. The shafts 43 and 44 each have a single set of blade 45 located between the two sets of blades of the respective adjacent shafts 41 and 42. Thus the blades 45 of the first, second, third and fourth rotary means are stepped as seen in side view (FIG. 5), hence the stepped nature of the apertures 34 and 35 through which the blades extend. This blade arrangement is significant in that it results in self-cleaning of the various rotary units as regards crop material. There is a tendency for weeds and stalks to wrap around any form of crop conveyor and in the present arrangement, this may tend to happen with the blades 45 of the first rotary means 37 and 38, the weeds and stalks bridging the spaced sets of blades. However, such stalks will be removed by the action of the respective adjacent sets of overlapping blades 45 of the rotary means 39 and 40, which move closely adjacent and between the first sets of blades, and so on until the fourth rotary means 43 and 44.

The direction of rotation of the rotary means on one side of a stalkway 12,13 is of the same but opposite to that of the rotary means on the opposed side of the stalkway, these directions being indicated at 71 and 72, respectively, and being such that, in operation, the crop material is moved rearwardly along the stalkways 12 and 13. Each of the shafts 37 and 38 of the first pair of rotary means carries a cutter disc 48,49 which overlap one another and cooperate to cut standing crop by a shearing action.

An additional pair of rotary means for each stalkway 12 and 13 in the form of shafts 50 and 51 fitted with crop conveyor blades 52 is provided forwardly of the mouths 53 and 54 of the respective stalkways. The shafts 50 and 51 are mounted within the forward extensions or nose members 17,18 and 19 with the blades 52 extending through the respective side walls immediately below the top walls 33. The paths of the blades 52 of each additional pair of rotary means 50,51 do not overlap. The blades 52 are similar to the blades 45.

Motive power for the row crop attachment is received via a chain 55 and sprocket 56, and other transmissions which are not shown, from the base unit 2. The sprocket 56 is keyed on an intermediate transverse shaft 57 which also supports conical gears 58 and 59 in mesh with conical gears 60 and 61 on the shafts of the rearwardmost shafts 43 and 44. The shafts 43 and 44 drive the next preceding shafts 41 and 42 via chain transmissions 62 and 63. The shafts 41 and 42 in turn drive intermediate shafts 64 and 65 and the next preceding shafts 39 and 40 via chain transmissions 66 and 67. The shafts 37 and 38 are driven from the intermediate shafts 64 and 65 via chain transmissions 68 and 69. All the chain transmissions 62,63,66,67,68 and 69 are provided within the respective guide frames 9, 10 and 11 so that they do not interfere with the movement of crop in the stalkways 12 and 13 and so that they are protected from dirt, etc. which might result in wear of the components. Furthermore, the intermediate shaft 57 is provided below the bottom walls 31 of the stalkways 12 and 13 so that it too does not interfere with the movement of crop material.

OPERATION

In operation in a corn field, the row crop attachment 1 is lowered to a position in which the skids 21 contact the ground and the various components are driven as described as the forage harvester is moved in the operative direction indicated at 70 in FIG. 1 so that the nost portions 17 and 19 are located on either side of the row of corn 74 and the nose portions 18 and 19 are located on either side of the row 73. Due to the forward movement of the harvester, the stalks of corn crop are moved inbetween and relative to the nose portions 17,19; 18,19 in a rearward direction so that they eventually enter in the stalkways 12,13 via the respective mouths 53,54 and are cut by the cutter discs 48 and 49. Any crop which has been blown down is lifted by the forward ends of the guide frame nose portions 17,18 and 19 and the additional rotary units 50,51 further assist in the lifting of this crop material and the feeding of it to the stalkways 12 and 13. The rotary units 50,51 also serve to compensate for minor misalignments of the machine relative to the crop rows and to irregular row spacings. Thus, they make the machine less "row" sensitive and reduce the amount of attention the operator has to give to this factor so that operation of the machine is less tiring.

The forwardmost or first pair of rotary means 37 and 38 grasp the cut crop stalks and hold them in a generally upright position while conveying them rearwardly along the respective stalkways 12 and 13 for presentation to the second pair of rotary means 39 and 40 which take them over smoothly and convey them at a relatively uniform speed further rearwardly in the stalkways. The same operation is repeated by all subsequent rotary means until the discharge end of the attachment is reached. The smooth transfer of the crop stalks from one rotary means to the next is particularly due to the blades 45 having circumscribing circles which overlap each other to the extent that the stalkways 12 and 13 are substantially covered thereby, so that there is no point in the stalkways where a hesitation in the movement of the stalks can occur. The curved operating face 46 of each blade 45 also aids this fluent and smooth transfer of crop material in that there is positive engagement between the blade and crop material and yet the latter is released at the point of hand over to the next rotary means without any tendency of the crop material to be swept round by the current conveying rotary means. Also the curved faces 46 minimize the squeezing of the crop material between themselves and the sidewalls of the stalkways 12 and 13.

The relatively widely spaced sets of blades 45 on the forwardmost rotary means 37 and 38 hold the stalks in a relatively upright position. However, the further rearwardly the stalks are conveyed, the less positive is this action due to the increasingly closer spaced sets of succeeding blades, with the result that the stalks gradually fall in a forward direction. This falling in a forward direction is assisted by a conventional push bar (not shown) positioned above the frames 9, 10 and 11 at the discharge end of the attachment. Furthermore, the single sets of blades 45 on the fourth or rearwardmost rotary means 43,44 are located relatively close to the respective bottom walls 31 so that they strike the butt ends of the stalks and cause them to be presented first to the feedrolls 3 of the base unit 2.

As already mentioned, the stepped nature of succeeding blades 45 on a given side of a stalkway 12, 13 prevents wrapping of crop material which is otherwise lost to the harvesting operation and can result in blockage of the machine.

Row crop attachments constructed in accordance with the present invention have been found to require significantly less maintenance which is an extremely important factor not only in terms of general operating costs but more importantly, in terms of reducing to a minimum downtime of a machine during a harvesting season. The reduced maintenance stems in the main from the use of rotary crop conveyor means as opposed to the previous chain type conveyors. Also the risks of chain breakage and associated therewith the risks of serious damage to the machine if a broken chain should by chance reach the cutterhead, are avoided. Maintenance can be further reduced by replacing the various chain transmissions of the illustrated embodiment by gear transmissions, thereby eliminating the need to adjust the chain tensions, from time to time, and eliminating the risk of chain breakage.

MODIFICATIONS

Figure 7:
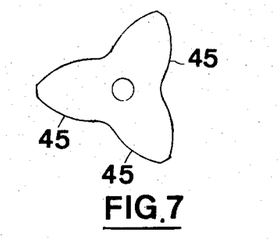
FIG. 7 is a plan view of a modified component.

While the illustrated embodiment of the invention is shown applied to a forage harvester, it is equally applicable to any type of harvesting machine, such as a combine harvester for example. The three-bladed elements of the illustrated embodiment may be replaced by elements having two blades or upwards of three blades. Furthermore, the leading and trailing faces of each blade 45 may be identical in shape with the one being the mirror image of the other. With such an arrangement, the rotary means can be reversed to good effect if a blockage occurs within the stalkways 12,13, the reversed rotation of the blades 45 merely resulting in a reversal of the movement of the crop material in the stalkways, generally without damage to the same. If the blades 45 of the illustrated embodiment were reversed, the previously trailing edges 47, and now leading edges, of the blades 45 would tend to cut the crop material, making recovery thereof difficult. FIG. 7 illustrates a three-bladed rotary element which can be used in a reverse drive mode.

Instead of providing rigid rotary bladed elements, the crop conveyor means may be in the form of overlapping flexible discs which flex on engagement with the crop but still serve to convey the latter along the stalkways.

In the illustrated embodiment, the crop conveyor means employed with the additional rotary means 50 and 51 are three bladed elements similar to those of the rotary means 37 to 44 associated with the respective stalkways 12 and 13 but these too may be varied as discussed above in connection with the latter rotary means. Furthemore, the blades 45 may be replaced by fingers which may be made retractable from the area between the associated pair of nose members 17,19; 18,19 retraction being effected by cam means, for example.

One of the cutter discs 48,49 may be replaced by a stationary shearing member with which the remaining cutter disc cooperates to cut standing crop. Alternatively, the discs 48 and 49 may be replaced by a rotatable knife arrangement cooperable with a stationary shearing member.

It will be seen that the present invention provides a row crop attachment which not only has a very low profile but is also lightweight, as a result of the reduced number of components, and of a relatively small volume which makes it easy to handle and adjust and also highly effective in operation.

Having thus described the invention, what is claimed is:

1. A row crop attachment for a harvesting machine comprising: a generally fore-and-aft extending frame having a forward inlet end and an opposing outlet end with a discharge opening therein, said frame including first and second guide members each having a first guide surface, the first guide surfaces of said first and second guide members spaced apart and defining an elongated stalkway therebetween terminating rearwardly adjacent said discharge opening;

a plurality of conveyor element pairs rotatably mounted on separate axes in opposing fashion on said first and second guide members along the length of said stalkway from said inlet end toward said outlet end, each said conveyor element including a plurality of outwardly extending crop engaging members, the path generated by rotation of each conveyor element overlapping that of the adjacent conveyor elements; and drive means to rotate said conveyor element pairs so as to move crop material along said stalkway from said inlet end to said outlet end.

2. A row crop attachment according to claim 1, wherein said guide surfaces on said first and second guide members are substantially parallel and form a substantially straight stalkway.

3. A row crop attachment according to claim 2, further including:

first and second nose pieces on the inlet ends, respectively, of each said guide member, each said nose piece defining an elongated inlet guide surface converging towards said stalkway and terminating thereat;

first and second inlet conveyor elements rotatably mounted on separate axes respectively on said first and second nose pieces; and said drive means also operably connected to said first and second inlet conveyor elements to rotate same in timed relation with said conveyor element pairs.

4. A row crop attachment according to either claim 2 or claim 3, wherein each said conveyor element is provided with two axially spaced sets of crop engaging means, the sets of crop engaging means being increasingly more closely spaced from the inlet end toward the outlet end of said frame so that the two sets of crop engaging means of one conveyor element are between the two sets of crop engaging means of the immediately preceding conveyor element;

a pair of discharge conveyor elements rotatably mounted on separate axes in opposing fashion on said first and second guide members adjacent said discharge opening, each said discharge conveyor element being provided with crop engaging means which extend between the two sets of crop engaging means of the adjacent conveyor element; and said drive means is also operably connected to said discharge conveyor elements.

5. A row crop attachment according to claim 4, wherein said crop engaging means comprises a star-shaped member with substantially radially extending fingers with curvinlinear crop engaging surfaces.

6. A row crop attachment according to claim 5 further including:

cutter means affixed to said first and second guide members proximate to the forward inlet end of said stalkway for severing crop stalks from the ground, said cutter means operably connected to said drive means.

7. A row crop attachment for a harvesting machine comprising:

a generally fore-and-aft extending frame having a forward inlet end and an outlet end with a discharge opening therein, said frame including first and second guide members each having a first guide surface, the first guide surfaces of said first and second guide members being spaced apart and defining an elongated stalkway therebetween terminating rearwardly adjacent said discharge opening;

a plurality of conveyor element pairs rotatably mounted on separate axes in opposing fashion on said first and second guide members along the length of said stalkway from said inlet end toward said outlet end, each said conveyor element being provided with two axially spaced sets of crop engaging means, the sets of crop engaging means being increasingly more closely spaced from the inlet end toward the outlet end of said frame such that the two sets of crop engaging means of one conveyor element are between the two sets of crop engaging means of the immediately preceding conveyor element;

a pair of discharge conveyor elements rotatably mounted on separate axes in opposing fashion on said first and second guide members adjacent said discharge opening, each said discharge conveyor element being provided with crop engaging means which extend between the two sets of crop engaging means of the adjacent conveyor element; and drive means operably connected to said conveyor elements and discharge conveyor elements to rotate same in timed relation to move crop material from said inlet end along said stalkway to said discharge opening.

8. A row crop attachment according to claim 7, wherein said guide surfaces on said first and second guide members are substantially parallel and form a substantially straight stalkway.

9. A row crop attachment according to claim 8, further including:

first and second nose pieces on the inlet ends, respectively, of each said guide member, each said nose piece defining an elongated inlet guide surface converging towards said stalkway and terminating thereat;

first and second inlet conveyor elements rotatably mounted on separate axes, respectively, on said first and second nose pieces; and said drive means also operably connected to said first and second inlet conveyor elements to rotate same in timed relation with said conveyor element pairs.

10. A row crop attachment according to claim 9, wherein said crop engaging means comprises a star-shaped member with substantially radially extending fingers with curvilinear crop engaging surfaces.

11. A row crop attachment according to claim 10, further including:

cutter means affixed to said first and second guide members proximate to the forward inlet end of said stalkway for severing crop stalks from the ground, said cutter means operably connected to said drive means.

12. A row crop attachment for a harvesting machine comprising:

a generally fore-and-aft extending frame having a forward inlet end and an outlet end with a discharge opening therein, said frame including first and second guide members each having a first guide surface, the first guide surfaces of said first and second guide members spaced apart and defining an elongated stalkway therebetween terminating rearwardly adjacent said discharge opening;

a plurality of conveyor element pairs rotatably mounted on separate axes in opposing fashion on said first and second guide members along the length of said stalkway from said inlet end toward said outlet end, each said conveyor element being provided with two axially spaced sets of crop engaging means, the sets of crop engaging means being increasingly more closely spaced from the inlet end toward the outlet end of said frame such that the two sets of crop engaging means of one conveyor element are between the two sets of crop engaging means of the immediately preceding conveyor element; and drive means operably connected to said conveyor elements to rotate same in timed relation to move crop material from said inlet end along said stalkway toward said discharge opening.

13. A row crop attachment according to claim 12, further including:

a pair of discharge conveyor elements rotatably mounted on separate axes in opposing fashion on said first and second guide members adjacent said discharge opening, each said discharge conveyor element being provided with crop engaging means which extend between the two sets of crop engaging means of the adjacent conveyor element, said discharge conveyor elements also being operably connected to said drive means for rotation.

14. A row crop attachment according to claim 13, further including:

first and second nose pieces on the inlet ends, respectively, of each said guide member, each said nose piece defining an elongated inlet guide surface converging towards said stalkway and terminating thereat;

first and second inlet conveyor elements rotatably mounted on separate axes, respectively, on said first and second nose pieces; and said drive means also operably connected to said first and second inlet conveyor elements to rotate same in timed relation with said conveyor element pairs.

15. A row crop attachment according to claim 14, wherein said crop engaging means comprises a star-shaped member with substantially radially extending fingers with curvilinear crop engaging surfaces.

16. A row crop attachment according to claim 15, further including:

cutter means affixed to said first and second guide members proximate to the forward inlet end of said stalkway for severing crop stalks from the ground, said cutter means operably connected to said drive means.

* * * * *